US00RE37974E

(19) United States
(12) Reissued Patent
Bowers

(10) Patent Number: US RE37,974 E
(45) Date of Reissued Patent: Feb. 4, 2003

(54) UNI-DIRECTIONAL FLUID VALVE

(75) Inventor: John Lawrence Bowers, High Wycombe (GB)

(73) Assignee: 3M Innovative Properties Company, St. Paul, MN (US)

(21) Appl. No.: 09/442,082

(22) Filed: Nov. 15, 1999

Related U.S. Patent Documents

Reissue of:
(64) Patent No.: 5,687,767
Issued: Nov. 18, 1997
Appl. No.: 08/686,839
Filed: Jul. 26, 1996

(30) Foreign Application Priority Data

Aug. 4, 1996 (GB) ..... 9515986

(51) Int. Cl.[7] ..... F16K 15/16
(52) U.S. Cl. ..... 137/855; 128/205.24; 128/206.15
(58) Field of Search ..... 137/855, 856, 137/857, 858; 128/205.24, 206.15, 205.25, 203.11

(56) References Cited

U.S. PATENT DOCUMENTS

| | | | | |
|---|---|---|---|---|
| 2,120,231 | A | 6/1938 | Cover | |
| 2,216,619 | A | 10/1940 | Lehmberg | |
| 2,320,770 | A | 6/1943 | Cover | |
| 2,864,394 | A | 12/1958 | Hempel | |
| 2,874,093 | A | 2/1959 | Moser, Jr. | |
| 2,893,387 | A | 7/1959 | Gongoll et al. | |
| 2,895,472 | A | 7/1959 | Matheson | |
| 2,999,498 | A | 9/1961 | Matheson | |
| 3,191,618 | A | 6/1965 | McKim | |
| 3,568,712 | A | 3/1971 | Rinehart | 137/855 |
| 4,414,973 | A | 11/1983 | Matheson et al. | 128/106 |
| 4,453,544 | A | 6/1984 | Silverthorn | |
| 4,456,016 | A | 6/1984 | Nowacki et al. | 128/725 |
| 4,630,604 | A | 12/1986 | Montesi | 128/106 |
| 4,631,376 | A | 12/1986 | Leone | |
| 4,749,003 | A | 6/1988 | Leason | |
| 4,759,758 | A | 7/1988 | Gabbay | |
| 4,838,262 | A | 6/1989 | Katz | 128/205 |
| 4,873,972 | A | 10/1989 | Magidson et al. | 128/206 |
| 4,888,009 | A | 12/1989 | Lederman et al. | |
| 4,934,362 | A | 6/1990 | Braun | 128/207 |
| 4,958,633 | A | 9/1990 | Angell | 128/201 |
| 4,972,765 | A | 11/1990 | Dixon | |
| 4,974,586 | A | 12/1990 | Wandel et al. | 128/206 |
| 4,981,134 | A | 1/1991 | Courtney | 128/207 |
| 5,036,806 | A | 8/1991 | Rarick | 137/855 |
| 5,255,687 | A | 10/1993 | McKenna | 137/855 |
| 5,325,892 | A | 7/1994 | Japuntich et al. | 137/855 |
| 5,346,375 | A | 9/1994 | Akiyama et al. | 137/855 |
| 5,509,436 | A | 4/1996 | Japuntich | |

FOREIGN PATENT DOCUMENTS

| | | |
|---|---|---|
| DE | 40 29 939 | 3/1992 |
| GB | 2072516 | 10/1981 |
| GB | 2 072 516 | 10/1981 |

*Primary Examiner*—John Rivell
(74) *Attorney, Agent, or Firm*—Jacobson Holman, PLLC

(57) ABSTRACT

A uni-directional fluid valve particularly for use as an exhalation valve for a filter mask comprises a flexible flap attached at one end to a concave portion of a seat. The mounting of the flap imparts to it a transverse curvature, stiffening the flap sufficiently for it to remain seated in the absence of a pressure differential across it even when orientated with the seat above the flap.

15 Claims, 3 Drawing Sheets

UNI-DIRECTIONAL FLUID VALVE

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,687,767. The reissue applications are application Ser. No. 09/442,082, the present application and Ser. No. 09/986,346, a continuation reissue of U.S. Pat. No. 5,687,767.*

BACKGROUND OF THE INVENTION

The present invention relates to a uni-directional fluid valve which may in particular be used as an exhalation valve for a filter mask. By a "filter mask" we mean a device adapted to be worn over the nose and mouth of a user and made from or incorporating a filter material to remove one or more unwanted components from the inspired air. To improve the comfort and efficiency of such devices it is common to provide a uni-directional exhalation valve on the mask which opens under the pressure differential consequent upon exhalation of the user to allow for a relatively unrestricted flow of exhalate out of the mask, but which closes under other conditions. Examples of valved filter masks are shown in GB-2072516, DE-4029939, U.S. Pat. No. 4,414,973, U.S. Pat. No. 4,838,262, U.S. Pat. No. 4,873,972, U.S. Pat. No. 4,934,362, U.S. Pat. No. 4,958,633, U.S. Pat. No. 4,974,586, U.S. Pat. No. 4,981,134 and U.S. Pat. No. 5,325,892.

A common type of exhalation valve comprises a circular diaphragm of e.g. silicone rubber and a cooperating circular valve seat surrounding the orifice which passes the user's exhalate. The diaphragm is clamped at its centre and marginal portions flex away from the seat when the user exhales. In another known type the diaphragm is in the form of a flexible flap which is attached to a cooperating seat structure at one end, that is to say in cantilever fashion, and flexes away from the rest of the seat when the user exhales. In the design of an exhalation valve it is important to maximise the cross-sectional area of the open orifice to allow free flow of exhalate through the valve, and also to minimise the differential air pressure required to open the valve (i.e. the valve "cracking" pressure). Centrally clamped diaphragm valves require a grater force to open them than cantilevered flap type valves of equivalent size because their available "lever arm" is less. Furthermore, the structure of a cantilevered flap type valve, when open, generally presents less of an obstruction to flow than the centrally clamped circular diaphragm type valve, or in other words imposes a smaller pressure drop for a given orifice size. A potential problem which must be addressed in the design of a cantilevered flap valve, however, lies in ensuring that the flap will remain closed in all orientations of the structure while it is not subject to an exhalatory pressure differential. That is to say, while in order to minimise the opening pressure differential of the valve it is desirable to employ a highly flexible flap of minimal thickness, the very flexibility of the flap may mean that if the valve is inverted in use (i.e. orientated with the seat lying above the flap), the flap may droop down from the seat when the user is not exhaling. This is clearly undesirable as it may open a leakage path into the mask for the contaminants which it is intended to exclude.

U.S. Pat. No. 5,325,892 discloses an exhalation valve with a cantilevered flap in which the valve seat has a seal ridge which is curved in the longitudinal direction of the flap, the curvature corresponding to a deformation curve exhibited by the flap when it bends under its own weight (with no pressure differential). In other words the design of that valve recognises that the flap is unable to stay flat when the structure is inverted and matches the configuration of the seat to the curvature of the flap under that condition.

SUMMARY OF THE INVENTION

In accordance with the present invention a uni-directional fluid valve comprises a flexible flap and a cooperating valve seat surrounding an orifice adapted to pass a fluid; the flap being attached to the seat at one end, in cantilever fashion, and being adapted to flex away from other portions of the seat when fluid flows in the permitted direction; and wherein there is a transverse curvature to at least the said one end of the flap whereby to maintain the flap substantially seated in the absence of a pressure differential across it, in any orientation of the valve.

The effect of the transverse curvature of the flap in a valve according to the invention is therefore stiffen the flap sufficiently to resist any drooping away from the seat when there is no applied pressure differential, even in the inverted orientation of the structure. As soon as the flap is "cracked" by an appropriate pressure differential, however, the free end of the flap will rapidly flex away from the seat and this flexure will progress along the length of the flap to a position determined by the instantaneous rate of fluid flow. At least the root end of the flap, at its position of attachment to the seat, will retain its transverse curvature however, and this will apply a restorative force to the flexed flap, assisting to reseat the flap when the permitted flow of fluid ceases. The stiffening effect of this transverse curvature is therefore to be distinguished from the longitudinal curvature of the flap in U.S. Pat. No. 5,325,892.

The flap for a valve according to the invention may be manufactured to exhibit the requisite transverse curvature in its natural state, e.g. by means of injection moulding or thermoforming. In the preferred embodiment to be described hereinafter, however, the flap as manufactured is flat and its curvature is imparted in use by means of the shaping of the valve structure in which it is mounted

BRIEF DESCRIPTION OF THE DRAWINGS

The invention will now be more particularly described, by way of example, with reference to the accompanying schematic drawings, in which.

DETAILED DESCRIPTION OF THE PREFERRED EMBODIMENT

Figure 1:
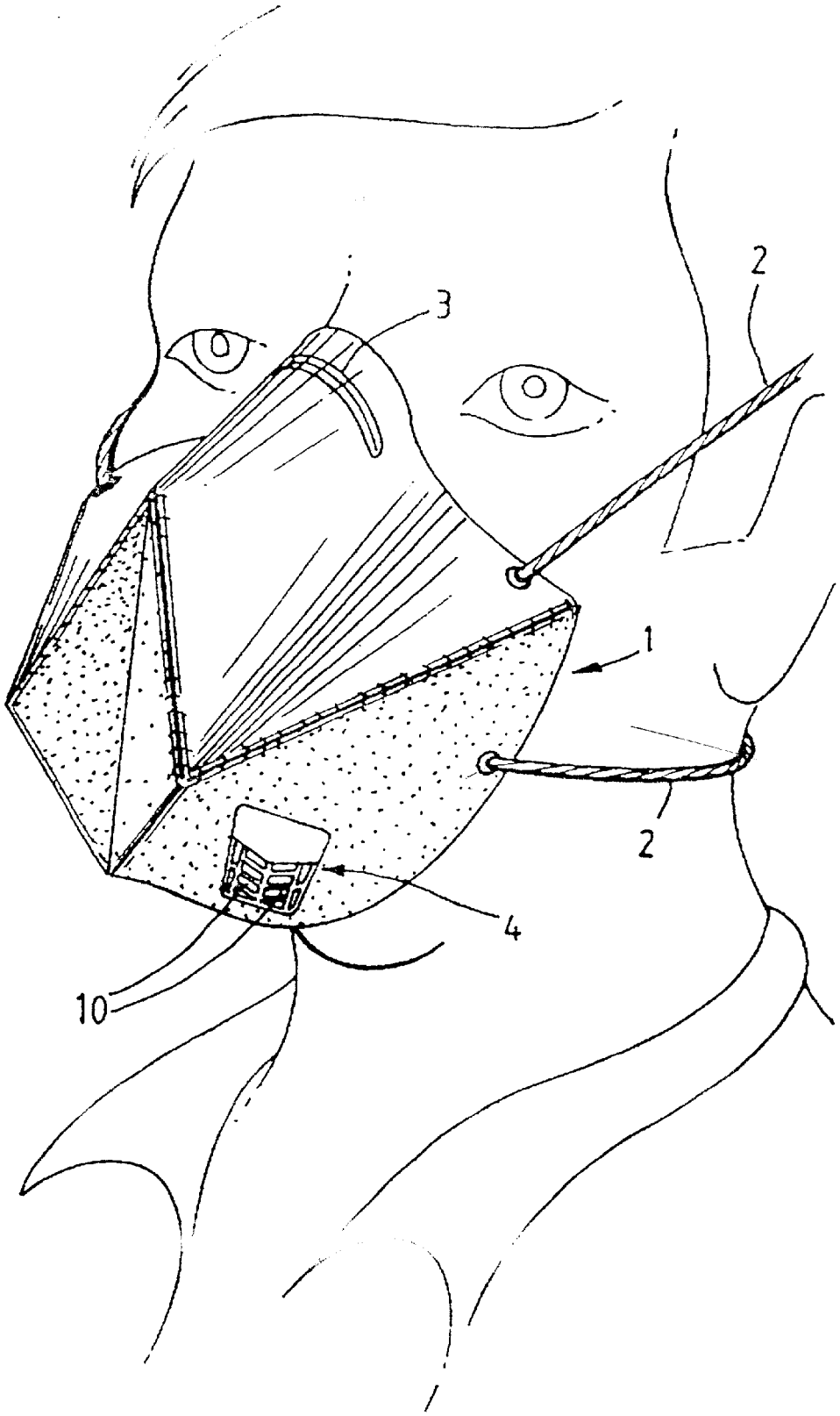
FIG. 1 is a perspective view of a filter mask incorporating a uni-directional valve in accordance with the invention as an exhalation valve.

Referring to FIG. 1, the illustrated mask 1 is made from one or more layers of flexible sheet filter material cut from a blank, folded and welded to form a cup-shaped structure to be worn over the nose and mouth of the user. It is in particular shaped in accordance with the invention in GB-2046102, to which reference is directed for a fuller description of the method of forming the mask from a flat blank. In use the peripheral edge of the mask forms a seal against the wearer's face and it is held in place by elastic headbands 2 and a deformable wire nose clip 3 as well known in the art.

At a suitable location in the side wall of the mask 1 an aperture is formed in which an exhalation valve 4 is fitted, the structure of which is more clearly illustrated in FIGS. 2 to 5.

Figure 2:
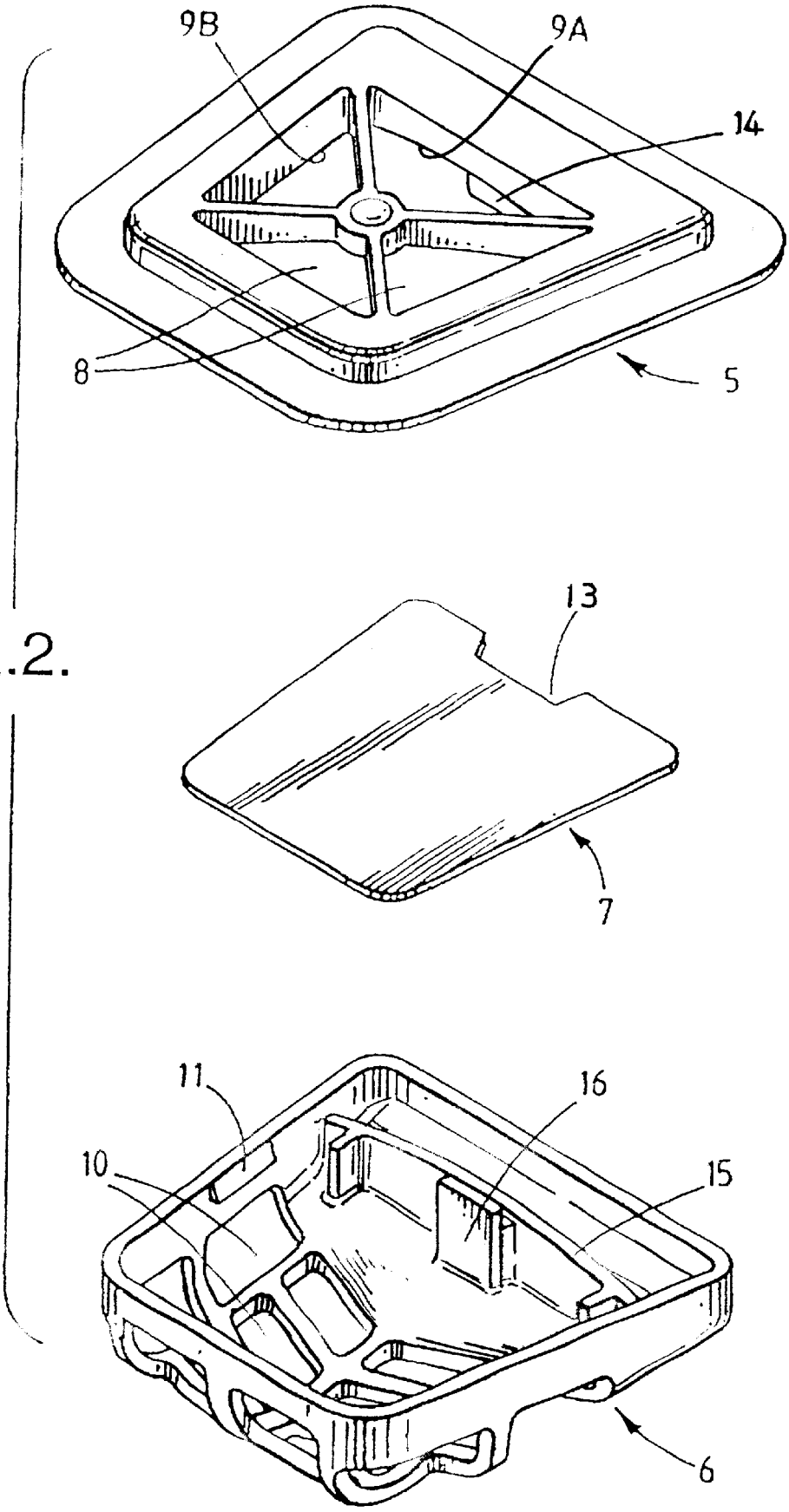
FIG. 2 is an "exploded" isometric view of the components of a preferred embodiment of the exhalation valve for the mask of FIG. 1.

The illustrated valve 4 comprises two interfitting moulded plastics housing members 5 and 6, and an elastomeric flap 7 which in the assembled valve is trapped at one end between the housing members. The upper housing member 5 as viewed in FIG. 2 is also seen from its opposite face in FIG. 3. It has inlet ports 8 passing through it which on the downstream side are surrounded by a seal ridge 9A/9B/9C of generally trapezial planform. The lower housing member 6 as viewed in FIG. 2 is of dished form with a series of outlet ports 10, and snaps onto the member 5 by means of a pair of integral lateral lugs 11 engaging in slots 12 formed in member 5. The flap 7 is of generally trapezial planform sized to fit over the seal ridge and is formed from a thin and highly flexible piece of elastomer, e.g. 0.5 mm thick latex natural rubber having a Shore micro hardness of about 30.

The flap 7 is positioned in the valve by a notch 13 at one end embracing a block 14 on housing member 5, and when the housing members are snapped together that end of the flap becomes trapped between the adjacent portion 9A of the seal ridge and a profiled block 15 upstanding from housing member 6. That is to say it is mounted in the valve in cantilever fashion. In its natural state, if the flap 7 is held horizontally at one end it will tend to bow longitudinally under the force of gravity, i.e. so that its opposite end droops down considerably from the plane of its fixed end. Both the block 15 and the facing portion 9A of seal ridge are, however, curved so as to impart to the flap a transversely arched configuration in the assembled valve, as seen particularly in FIGS. 4 and 5. In the illustrated embodiment this arching is accentuated for the central part of the flap by means of a second profiled block 16 upstanding from the housing member 6 in front of and to a slightly greater height than the block 15, although this is not essential in all embodiments of the invention. The arching of the flap stiffens it sufficiently to prevent it drooping away from any part of the seal ridge under zero pressure differential conditions, whatever the orientation of the valve. The preferred orientation of the valve is in fact with the outlet ports 10 directed with a downward component, as indicated in FIG. 1, so that the user's exhalate will not mist any associated eyewear, and if the user lowers his head the valve may become oriented with the flap 7 lying wholly below the housing member 5.

In use, therefore, the flap 7 seats upon the seal ridge to prevent the passage of any air into the mask through the valve 4 while the user is not exhaling. At the commencement of exhalation, as soon as a minimum "cracking" pressure differential is applied to the flap 7 from the interior of the mask the free end of the flap will lift away from the seal ridge in the sense of the arrow X in FIG. 4, and flexure of the flap will progress rapidly along its length towards the fixed (root) end, to a position determined by the instantaneous rate of flow of exhalate out through ports 8 and 10. When exhalation ceases, the restorative effect of the arched mounting of the flap will cause the flap as a whole rapidly to reseat upon the seal ridge, to minimise the risk of any inward leakage of contaminant through the valve in the period between the end of exhalation and the commencement of inhalation. In particular, the flap 7 does not depend for its closure upon the subsequent application of an inhalatory pressure differential.

Figure 3:
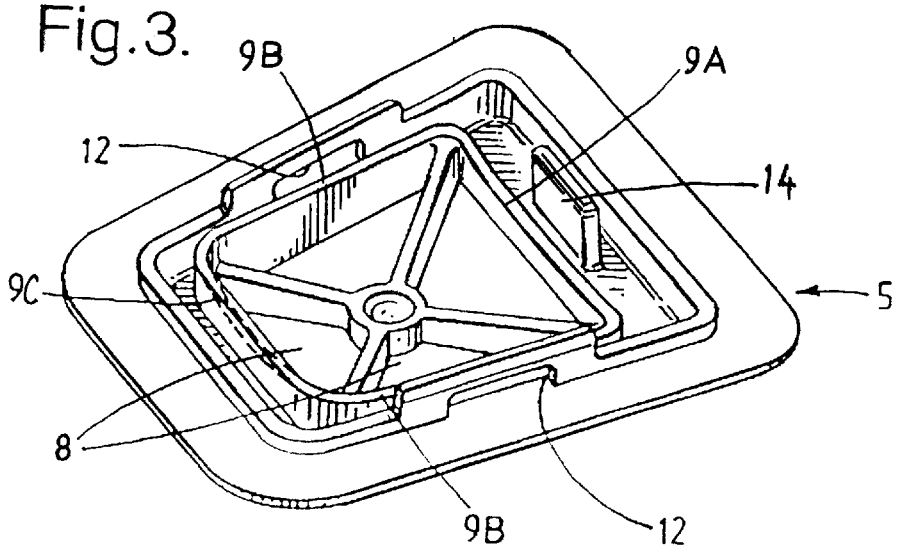
FIG. 3 is an isometric view showing the interior of the upper housing member of FIG. 2.
Figure 4:
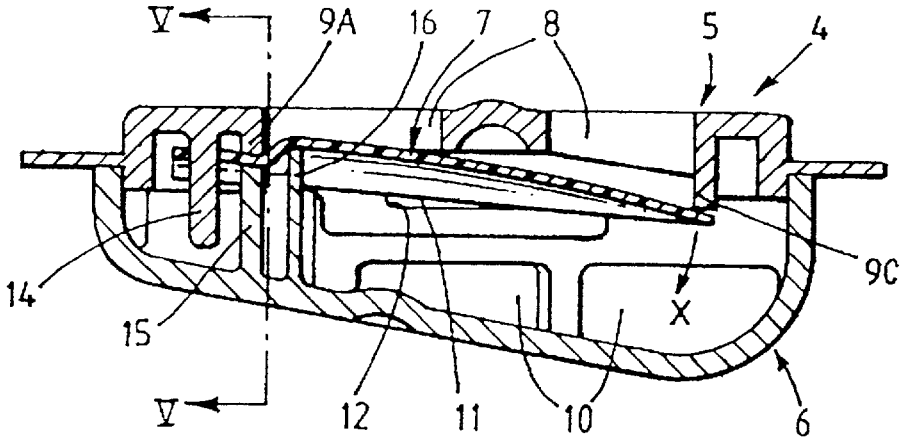
FIG. 4 is a longitudinal section through the valve assembled from the components of FIG. 2, on the line IV—IV of FIG. 5, in the closed condition.
Figure 5:
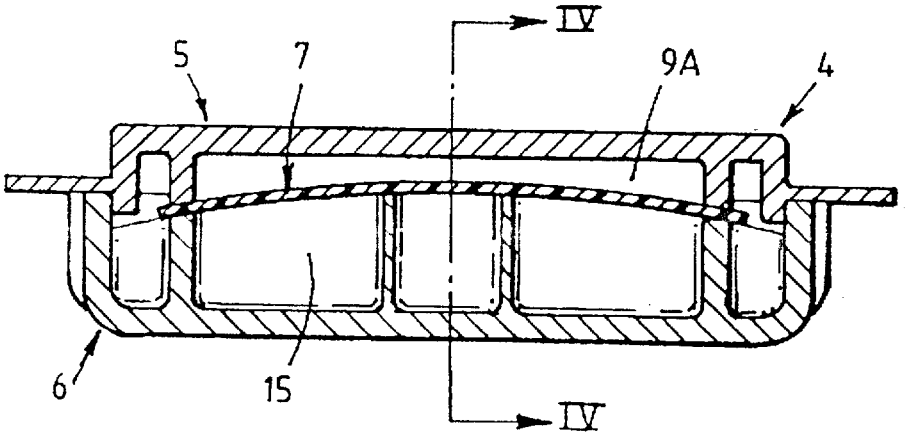
FIG. 5 is a section on the line V—V of FIG. 4.

From FIG. 3 it will be seen that while the portion 9A of the seal ridge at the root end of the flap has a concave curvature the remainder 9B/9C of the ridge has a flat surface. From FIGS. 3 and 4 it will also be seen that the portion 9C of the seal ridge at the free end of the flap rises further from the plane of the member 5 than does the root end portion 9A, and the two side portions 9B are straight but inclined as viewed in elevation. The combined effect of this configuration is that the transverse curvature of the flap 7 decreases towards its free end, which lies flat against seal ridge portion 9C, while a degree of longitudinal curvature is also imparted to the central section of the flap (but not to its side edges which lie flat against the ridge portions 9B). This has been found to enhance the stability of the flap in its closed condition while minimising the opening pressure differential for the particular embodiment illustrated. In other embodiments, however, there may be no longitudinal curvature of the flap and/or its transverse curvature may extend throughout its whole length, in the latter case the seal ridge portion 9C being modified to a concave form as indicated in broken line in FIG. 3.

I claim:

1. A uni-directional fluid valve comprising a cantilevered flexible flap and a cooperating valve seat surrounding a valve orifice; the cantilevered flexible flap having a planform defining a root end and free end at opposite ends of a longitudinal axis of the flap, and two peripheral side edges respectively extending between the root end and the free end; the valve seat having sealing surfaces that contact the flap along said root end, free end and peripheral side edges when the fluid valve is closed; the cantilevered flexible flap is [attached to] *mounted in contact with* the respective sealing surface of the valve seat at said root end and is freely movable to flex away from the respective sealing surfaces of the valve seat at said free end and along at least portions of said peripheral side edges when fluid flows through the fluid valve and the fluid valve is open; and said root end of the cantilevered flexible flap and the respective sealing surface that contacts the cantilevered flexible flap at said root end have a fixed curvature in a direction transverse to said longitudinal axis, said transverse curvature biases the flap and maintains it substantially in contact with all said sealing surfaces of the valve seat in the absence of an opening pressure differential across the flap, in any orientation of the valve.

2. A valve according to claim 1 wherein the cantilevered flexible flap exhibits said curvature in its natural state.

3. A valve according to claim 1 wherein said curvature is imparted to the cantilevered flexible flap by virtue of its mounting on the valve seat.

4. A valve according to claim 3 wherein the cantilevered flexible flap is trapped at said root end between confronting respectively concave and convex surfaces of first and second structural members, said concave surface comprising a said sealing surface of said valve seat.

5. A valve according to claim 4 wherein said second structural member presents a further surface in contact with a central portion of the cantilevered flexible flap adjacent to said root end to accentuate the curvature thereof.

6. A valve according to claim 1 wherein the respective said sealing surface of the valve seat which the free end of the cantilevered flexible flap contacts is substantially flat.

7. A valve according to claim 1 wherein the respective said sealing surface of the valve seat which the free end of the cantilevered flexible flap contacts is of concave curvature.

8. A valve according to claim 1 wherein the respective said sealing surfaces of the valve seat which the peripheral side edges of the cantilevered flexible flap contact are substantially flat.

9. A valve according to claim 1 wherein the mounting of the cantilevered flexible flap in the valve seat imparts a longitudinal curvature to the central section of the cantilevered flexible flap.

10. A filter mask having an exhalation valve comprising a cantilevered flexible flap and a cooperating valve seat surrounding a valve orifice; the cantilevered flexible flap having a planform defining a root end and a free end at opposite ends of a longitudinal axis of the cantilevered flexible flap, and two peripheral side edges respectively extending between the root end and the free end; the valve seat having sealing surfaces that contact the cantilevered flexible flap along said root end, free end and peripheral side edges when the exhalation valve is closed; the cantilevered flexible flap is [attached to] *mounted in contact with* the respective sealing surface of the valve seat at said root end and is freely movable to flex away from the respective sealing surfaces of the valve seat at said free end and along at least portions of said peripheral side edges when a user of the filter mask exhales and causes the exhalation valve to open: and said root end of the cantilevered flexible flap and the respective sealing surface that contacts the cantilevered flexible flap at said root end have a fixed curvature in a direction transverse to said longitudinal axis, said transverse curvature biases the flap and maintains it substantially in contact with all said sealing surfaces of the valve seat in the absence of an exhalatory pressure differential across the flap, in any orientation of the valve.

11. A filter mask according to claim 10 wherein the exhalation valve is so located that during normal head movements of a wearer the cantilevered flexible flap will lie below the valve seat.

*12. A uni-directional fluid valve comprising:*

*a cantilevered flexible flap and a cooperating valve seat surrounding a valve orifice;*

*the cantilevered flexible flap having a planform defining a root end and a free end at opposite ends of a longitudinal axis of the flap;*

*the valve seat having sealing surfaces that contact the flap at said root end and the free end when the fluid valve is closed;*

*the cantilevered flexible flap being mounted in contact with the respective sealing surface of the valve seat at said root end and being freely movable to flex away from the respective sealing surface of the valve seat at said free end when fluid flows through the fluid valve and the fluid valve is open; and*

*said root end of the cantilevered flexible flap and the respective sealing surface that contacts the cantilevered flexible flap at said root end having a transverse configuration extending in a direction transverse to said longitudinal axis, said transverse configuration resulting in maintaining the flap substantially in contact with said sealing surfaces of the valve seat in the absence of an opening pressure differential across the flap, in any orientation of the valve.*

*13. A uni-directional fluid valve comprising:*

*a cantilevered flexible flap and a cooperating valve seat surrounding a valve orifice;*

*the cantilevered flexible flap having a planform defining a root end and a free end at opposite ends of a longitudinal axis of the flap, and two peripheral side edges respectively extending between the root end and the free end;*

*the valve seat having sealing surfaces that contact the flap at said root end, said free end, and said peripheral side edges when the fluid valve is closed;*

*the cantilevered flexible flap being mounted in contact with the respective sealing surface of the valve seat at said root end and being freely movable to flex away from the respective sealing surface of the valve seat at said free end and along at least portions of said peripheral side edges when fluid flows through the fluid valve and the fluid valve is open; and*

*said root end of the cantilevered flexible flap and the respective sealing surface that contacts the cantilevered flexible flap at said root end having a transverse configuration extending in a direction transverse to said longitudinal axis, said transverse configuration resulting in maintaining the flap substantially in contact with said sealing surfaces of the valve seat in the absence of an opening pressure differential across the flap, in any orientation of the valve.*

*14. A filter mask having an exhalation valve comprising:*

*a cantilevered flexible flap and a cooperating valve seat surrounding a valve orifice;*

*the cantilevered flexible flap having a planform defining a root end and a free end at opposite ends of a longitudinal axis of the cantilevered flexible flap;*

*the valve seat having sealing surfaces that contact the cantilevered flexible flap along said root end and said free end when the exhalation valve is closed;*

*the cantilevered flexible flap being mounted in contact with the respective sealing surface of the valve seat at said root end and being freely movable to flex away from the respective sealing surface of the valve seat at said free end when a user of the filter mask exhales and causes the exhalation valve to open and wherein said root end of the cantilevered flexible flap and the respective sealing surface that contacts the cantilevered flexible flap at said root end have a transverse configuration extending in a direction transverse to said longitudinal axis so that the flap is substantially maintained in contact with all of said sealing surfaces of the valve seat in the absence of an exhalatory pressure differential across the flap, in any orientation of the valve.*

*15. A filter mask having an exhalation valve comprising:*

*a cantilevered flexible flap and a cooperating valve seat surrounding a valve orifice;*

*the cantilevered flexible flap having a planform defining a root end and a free end at opposite ends of a longitudinal axis of the cantilevered flexible flap, and two peripheral side edges respectively extending between the root end and the free end;*

*the valve seat having sealing surfaces that contact the cantilevered flexible flap along said root end, free end and peripheral side edges when the exhalation valve is closed;*

*the cantilevered flexible flap being mounted in contact with the respective sealing surface of the valve seat at said root end and being freely movable to flex away from the respective sealing surfaces of the valve seat at said free end and along at least portions of said peripheral side edges when a user of the filter mask exhales and causes the exhalation valve to open and wherein said root end of the cantilevered flexible flap and the respective sealing surface that contacts the cantilevered flexible flap at said root end have a transverse configuration extending in a direction transverse to said longitudinal axis so that the flap is substantially maintained in contact with all of said sealing surfaces of the valve seat in the absence of an exhalatory pressure differential across the flap, in any orientation of the valve.*

* * * * *

UNITED STATES PATENT AND TRADEMARK OFFICE

CERTIFICATE OF CORRECTION

PATENT NO. : RE 37,974 E
DATED : February 4, 2003
INVENTOR(S) : Bowers, John L.

It is certified that error appears in the above-identified patent and that said Letters Patent is hereby corrected as shown below:

Column 4,
Line 20, insert -- a -- between “and” and “free”

Signed and Sealed this

Thirteenth Day of May, 2003

JAMES E. ROGAN
*Director of the United States Patent and Trademark Office*

UNITED STATES PATENT AND TRADEMARK OFFICE

CERTIFICATE OF CORRECTION

PATENT NO. : RE 37,974 E
DATED : February 4, 2003
INVENTOR(S) : John Lawrence Bowers It is certified that error appears in the above-identified patent and that said Letters Patent is hereby corrected as shown below:

Column 1,
Lines 7-11, should read,
-- Notice: More than one reissue application has been filed for the reissue of patent 5,687,767. The reissue applications are SN 09/442,082(present application) and SN 09/986,346, all of which are continuation Reissues of Patent No. 5,687,767. --.

Signed and Sealed this

Fifteenth Day of November, 2005

JON W. DUDAS
*Director of the United States Patent and Trademark Office*

UNITED STATES PATENT AND TRADEMARK OFFICE

CERTIFICATE OF CORRECTION

PATENT NO. : RE 37,974 E
DATED : February 4, 2003
INVENTOR(S) : Bowers, John L.

It is certified that error appears in the above-identified patent and that said Letters Patent is hereby corrected as shown below:

Title page,
Item [30], Foreign Application Priority Data, delete "1996" and replace with -- 1995 --.

Signed and Sealed this

Twenty-eighth Day of March, 2006

JON W. DUDAS
*Director of the United States Patent and Trademark Office*